United States Patent [19]

Ezaki et al.

[11] Patent Number: 5,176,727
[45] Date of Patent: Jan. 5, 1993

[54] CASSET TYPE MIST FILTER

[75] Inventors: Masafumi Ezaki; Haruya Nagai, both of Tokyo, Japan

[73] Assignee: Krosaki Corporation, Fukuoka, Japan

[21] Appl. No.: 775,528

[22] Filed: Oct. 15, 1991

[51] Int. Cl.⁵ .............................................. B01D 39/20
[52] U.S. Cl. ..................................... 55/523; 210/496; 210/510.1
[58] Field of Search ................ 55/90, 97, 523, 490, 55/495, 503, 504, 508, 512; 210/510.1, 496

[56] References Cited

U.S. PATENT DOCUMENTS 4,221,770   9/1980   Chapman ................................. 55/90

Primary Examiner—Frank Sever
Attorney, Agent, or Firm—Wegner, Cantor, Mueller & Player

[57] ABSTRACT

A ceramic plate having three dimensional reticulated pores is secured to a metal frame comprising drain holes at the bottom, so that the mechanical strength of the filter is improved, handling thereof is easier, and drainage and drip thereof are easily performed.

5 Claims, 7 Drawing Sheets 5,176,727

CASSET TYPE MIST FILTER

BACKGROUND OF THE INVENTION

The present invention relates to a casset type mist filter for collecting oil and fat mist at an exhaust duct in a kitchen.

A lot of oil and fat mist sticks to an exhaust duct in a kitchen. The oil and fat mist could become a medium of fire, so that it should be removed from the exhaust by a filter.

As such a filter, a ceramic plate having three dimensional reticulated pores has been disclosed (Japanese utility model provisional publication no. 63-118915) instead of a prior art of a metal baffle and a metal fiber.

The advantage of a ceramic plate as a filter is such that the ceramic comprises a numerous number of pores, that is, its percentage of air hole is considerably large, and it also comprises a three dimentional reticulated pores, so that it efficiently impacts with a fluid and, thus, collects the mist well. Further, the ceramic plate is lighter than the metal, so that it is easier to handle. Also, the ceramic plate is suitable as a material of the mist filter because its combustion resistance and chemical resistance are superior.

The ceramic plate has a lot of advantages as a mist filter as described above. However, it lacks a shock resistance, so that its mechanical strength should be improved, and an attachment and a detachment work from a duct for cleaning is a problem that should be resolved. No prior art has resolved such problems.

The object of the present invention, therefore, is to provide a mist filter which is shock resistant, easy to be attached and detached for cleaning, easy to drain the collected mist and easy to drip a detergent after cleaning.

DETAILED DESCRIPTION OF THE INVENTION

Figure 1:
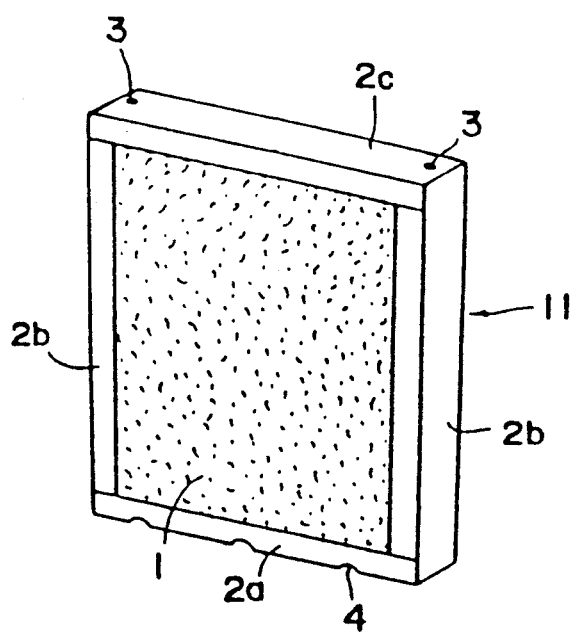
FIG. 1 to FIG. 5 show a perspective views of the present invention.

To accomplish the objects, the filter is provided with a ceramic plate having a three dimentional reticulated pores therethrough and a metal frame comprising drain holes at the bottom. The filter is to be attached to a receiver of a duct.

The metal frame comprises a bottom frame, a top frame, a pair of side frames and a number of screws. The metal frame can be arranged to comprise a number of drain holes to drain a fluid out of collected mist, a number of projections to prevent that the whole bottom surface thereof contacts to the receiver of the duct, so that the collected fluid easily drains (the projections can be provided to the receiver), a metal channel bottom frame having screw holes at its both end, a pair of metal channel side frames having grips for supporting the ceramics plate from its side, a metal channel top frame having screw holes at its both end for supporting from the top, and screws.

The metal channel top frame can be provided with a number of drain holes, so that drip of the detergent after cleaning is performed faster, and that it dries quickly. This is a big advantage for handling and maintaining the filter.

The metal frame can be arranged to comprise a U-shape metal channel frame which is unitedly composed of three sides of a frame, a metal channel frame, the rest side of the metal frame, having its both side screw holes for securing therewhich to the U-shape frame and a number of screws, so that the structural strength thereof improves and it enables an easy attachment and detachment of the ceramic plate to/from the metal frame.

A number of other means can be added to the present invention described above. For example, the shape of the U-shape metal channel top frame can be arranged similar to that of the U-shape metal channel bottom frame, so that it can be attached to the receiver of the duct upside down, which makes the work of attachment easier and quicker.

Another example is such that the metal frame comprises a U-shape metal channel frame forming three sides thereof and a metal channel frame forming the rest of the sides and a number of screws, and the top frame is provided with a number of drain holes to enable an easy drip of detergent after cleaning. the bottom frame is provided with a number of drain holes to drain a fluid out of the collected mist, the bottom frame is also provided with a number of projections to enable an easy drain of the fluid by keeping a space from the receiver of the duct, and the side frames are provided with grips, so that the structual strength of the metal frame improves and the work efficiency of attaching the ceramic plate to the metal frame improves.

In the U-shape metal channel frame disclosed above, the shape of the top frame which positions the rest side of the metal frame can be arranged similar to the bottom frame. The grip can be positioned not only to the side frame but also to the top or the bottom frames.

The ceramic plate can be divided into two (or more), and to reinforce the strength of the ceramic plate and to prevent the leak of the mist, H-shape metal channel middle frame can be provided between the ceramic plates. Instead of the H-shape middle frame, the contact surfaces of the ceramic plates can be tapered, so that the mist is prevented from being carried straightforwardly. The divided ceramic plates are effective for a use of a larger filter when the strength thereof is concerned.

According to the present invention, the ceramic plate having reticulated pores is supported by a metal frame, so that the shook resistance thereof is improved. This enables an easy attachment and detachment of the filter. The drainage of the filter remains superior. According to the present invention disclosed in claim 2, the assembly of the filter is easily proceeded. The metal frame disclosed in claim 3 comprises grips, so that it enables an easier handling of the filter. Said metal frame comprises a number of drain holes and projections, so that the drainage of the fluid is smoothly performed in their side directions. According to the present invention disclosed in claim 4, the drip of the detergent can be performed quickly. According to the present invention disclosed in claim 5, the filter is structurally strengthened, and the attachment and the detachment of the ceramic plate can be easily performed.

PREFERRED EMBODIMENT OF THE INVENTION

FIG. 1 shows a casset type mist filter used in a kitchen disclosed in claim 1. The ceramic plate 1 of the filter having three dimentional reticulated pores is supported by a stainless made metal frame composed of a bottom frame 2a, a pair of metal side frames 2b and a top frame 2c.

Figure 2:
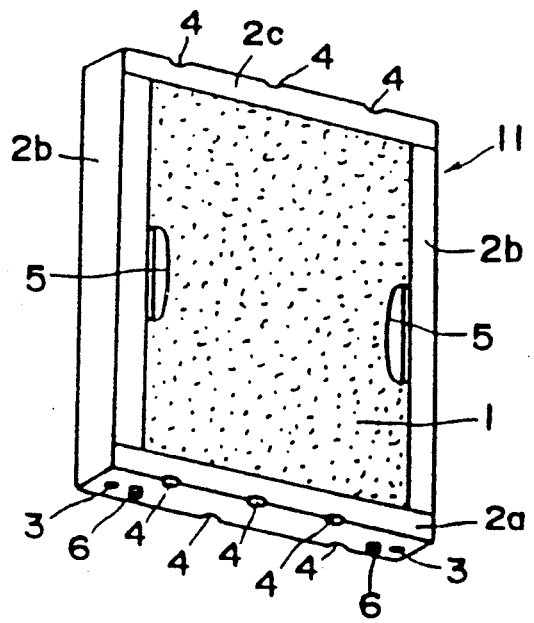

FIG. 2 shows the present invention disclosed in claim 3. The metal bottom frame 2a is provided with drain holes 4 and projections 6 for maintaining a gap from the receiver for better drainage. The metal side frames 2b is provided with grips 5. The metal top frame 2c is also provided with drain holes 4 for better drainage. The drain holes 4 of the bottom frame 2a can be applied as a drain for a detergent for cleaning the filter. The filter disclosed in claim 3 is easy to grip and drip and it is structurally strengthened.

Figure 3:
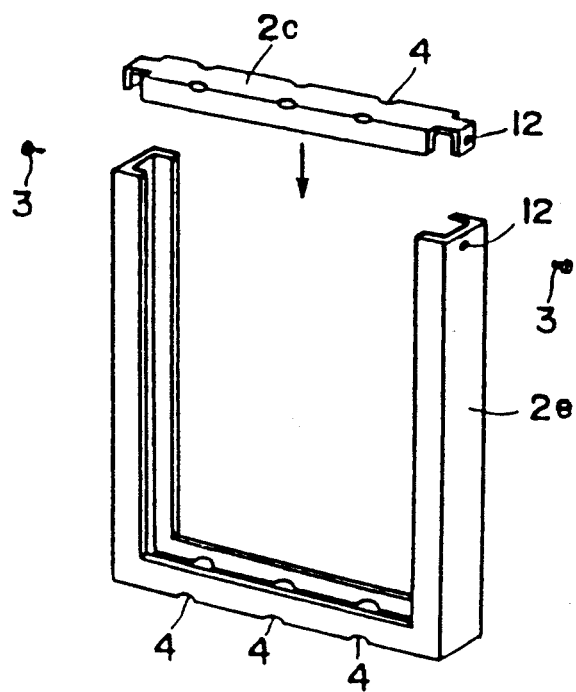
Figure 3:
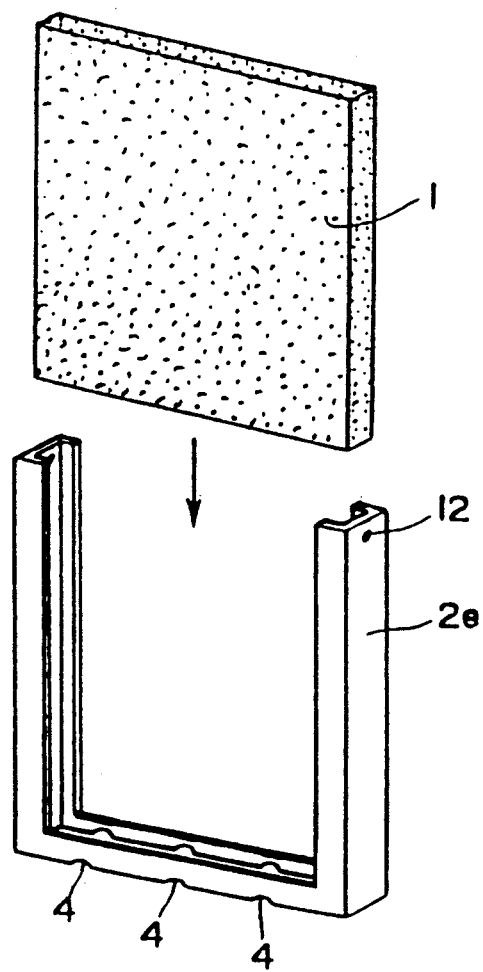

FIG. 3 shows the present invention disclosed in claim 5. The metal frame is composed of a U-shape metal frame 2e structuering the three sides of the metal frame and a top frame 2c. The top frame 2c is secured to the frame 2e with screws 3 through schrew holes 12 after the ceramic plate is attached to the frame 2e as shown FIG. 3b.

Figure 4:
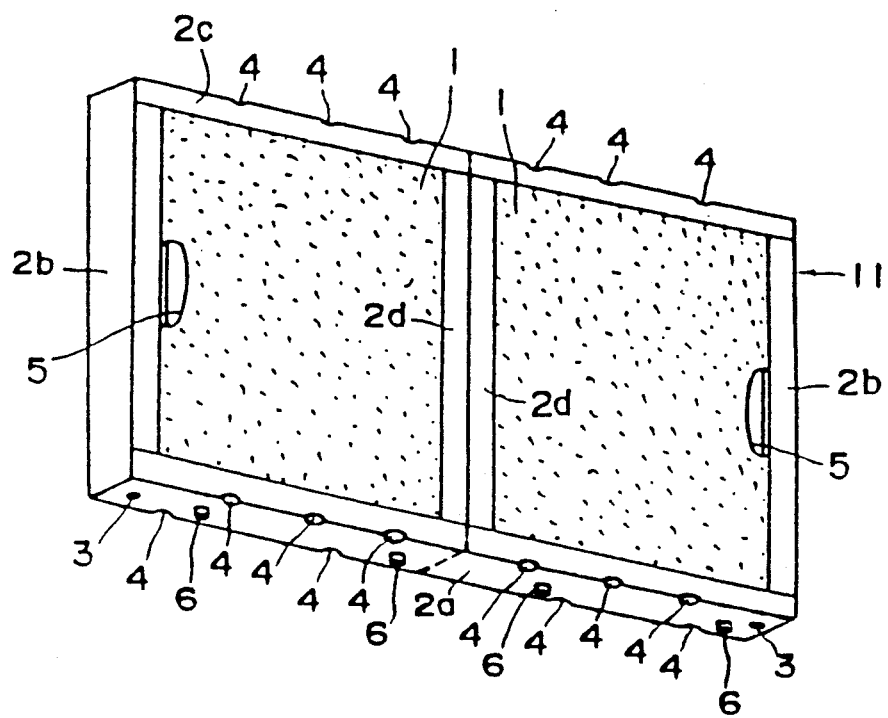

FIG. 4 shows another preferred embodiment of the present invention. The ceramic plate 1 is divided into two pieces and a H-shape metal channel middle frame 2d is positioned between the ceramic plates 1. This is advantageous when a ceramic plate is larger. The strength of the each ceramic plate 1 is improved compared to a use of a single plate. The leak of the fluid is perfectly prevented by the middle frame 2d that would occur otherwise.

Figure 5:
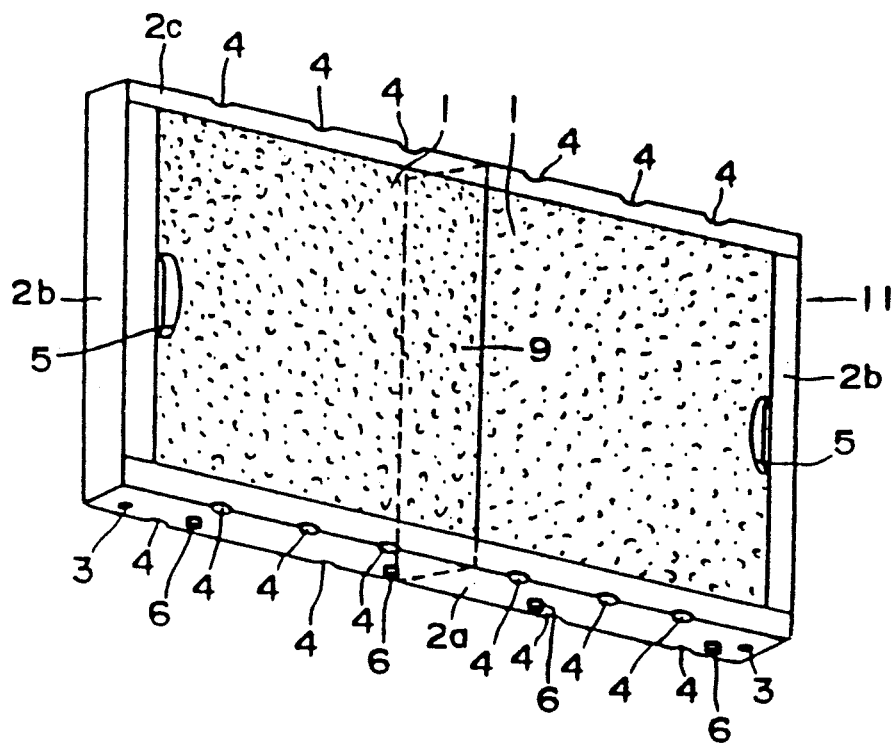

FIG. 5 shows an another preferred embodiment, in which a ceramic plate is divided into two and the contact surfaces 9 thereof are tapaered. The leak of the fluid can be prevented by the tapered surface 9, since it prevents the straightforward movement of the fluid.

Figure 6:
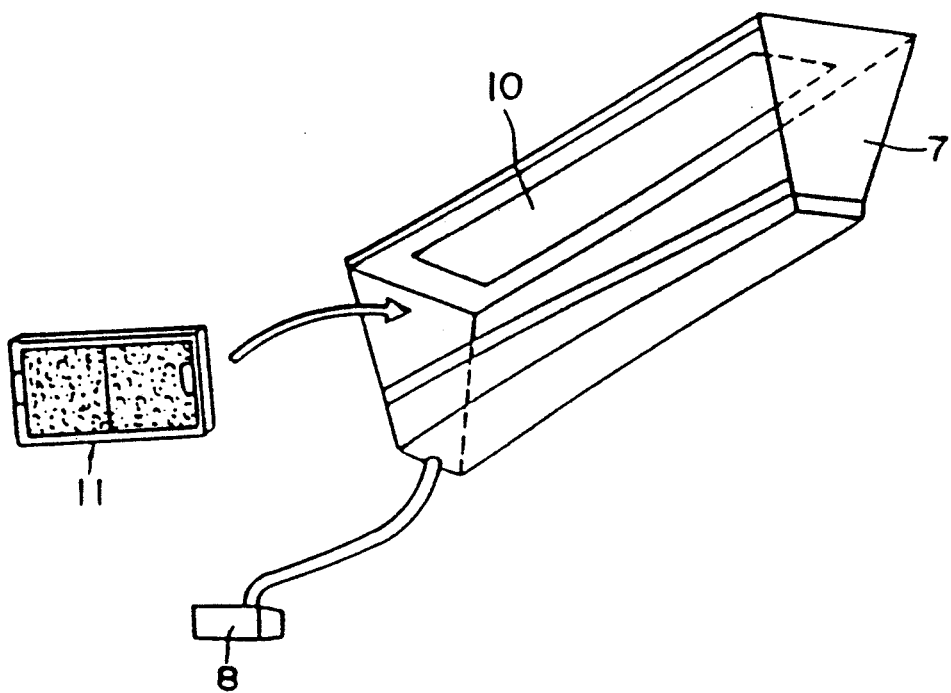
FIG. 6 shows a perspective illustration of a duct receiver to which the present invention is attached.
Figure 7:
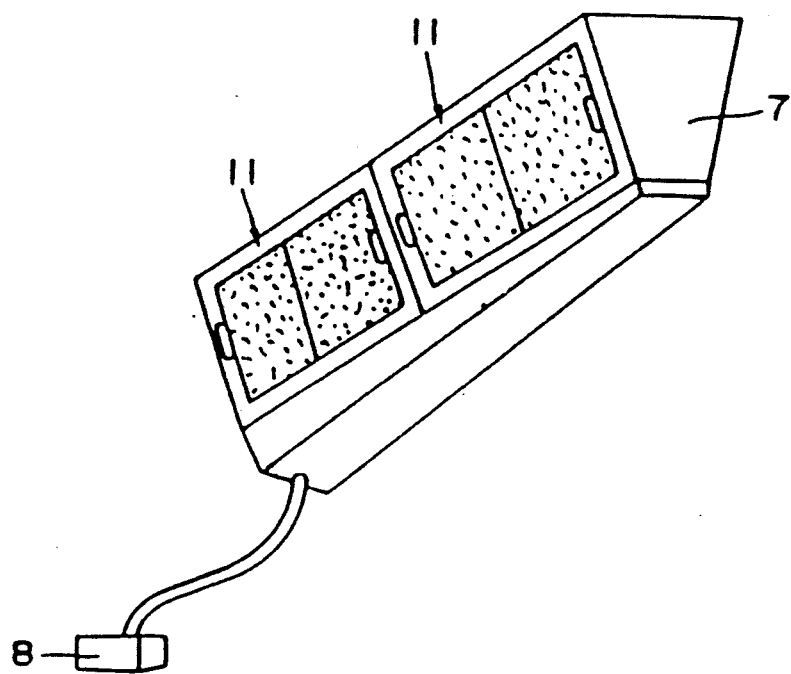
FIG. 7 shows a perspective illustration of the duct receiver comprising the present invention.

FIGS. 6 and 7 show a receiver 7 of a duct to which the filter 11 of the present invention is attached. The receiver comprises a oil cup 8 connected to the receiver 7 by a hose, and an opening 10 of a duct. The attachment and the detachment of the filter 11 to/from the receiver 7 can be performed by a number of means, for example, by such as a insertion in a groove, a magnet, a latch, a clip and so-called an one-touch type.

The remarkable effects of the present invention are as follows.

(1) The ceramic plate is supported by a metal frame, so that the mechanical and structual strength thereof are improved, and that the handling thereof is easily performed.

(2) The metal frame is provided with grips, so that handling the filter is easier.

(3) The metal frame is provided with drain holes, so that drainage of the mist fluid and drip of detergent are proceeded quickly.

(4) The filter according to the present invention is a casset type and is easily detached, so that cleaning thereof is easy.

(5) The metal frame is provided with projections, so that mist fluid is smoothly drained to the side directions.

(6) The metal frame comprises a unified metal channel U-shape frame structuring three sides of the frame, so that the structural strength thereof is improved and an attachment and a detachment of the filter are easily performed.

We claim:

1. A cassette type mist filter comprising: means for attachment of said filter to an entrance portion of a kitchen exhaust duct,
a substantially rectangular ceramic plate having three dimensional interconnected reticulated pores; and
a metal frame including top side and bottom portions surrounding the edges of said plate, said frame including drain holes in said bottom portion, said frame comprising the only support for said ceramic plate.

2. A cassette type mist filter as claimed in claim 1 wherein said bottom portion includes at least two projections for maintaining a space between said frame and a receiving portion of said duct, whereby smooth drainage is accomplished through said drain holes.

3. A cassette type mist filter as claimed in claim 1 wherein said frame portions each comprise U-shaped channel members and said side frames include grips.

4. A cassette type mist filter as claimed in claim 3 wherein said frame top portion includes drain holes.

5. A cassette type mist filter as claimed in claim 1 wherein three sides of said frame portions are U-shaped metal channels of a unified structure, said fourth side including screw holes through which means are applied for securing said side to said three sided U-shaped metal frame.

* * * * *